United States Patent [19]

Lewins

[11] Patent Number: 5,371,533
[45] Date of Patent: Dec. 6, 1994

[54] IMAGE RESTORATION SYSTEMS AND METHODS UTILIZING INPUT SIGNALS WITH MODIFIED DC SIGNAL CONTENT

[75] Inventor: Lloyd J. Lewins, Marina Del Ray, Calif.

[73] Assignee: Hughes Aircraft Company, Los Angeles, Calif.

[21] Appl. No.: 752,391

[22] Filed: Aug. 30, 1991

[51] Int. Cl.$^5$ .............................................. H04N 7/18
[52] U.S. Cl. .................................. 348/257; 348/145; 348/166; 348/246
[58] Field of Search .................. 358/113, 163, 213.17, 358/168, 169, 171, 213.15, 213.16, 174, 176, 177; 250/332, 252.1 A, 252.1 R, 252.1

[56] References Cited

U.S. PATENT DOCUMENTS

| | | |
|---|---|---|
| 4,423,437 | 12/1983 | Beck et al. ........................... 358/113 |
| 4,712,010 | 12/1987 | Alm ................................. 358/113 X |
| 4,835,606 | 5/1989 | Peck ...................................... 358/113 |
| 4,879,598 | 11/1989 | Seto ...................................... 358/113 |
| 4,948,964 | 8/1990 | Guhlke ....................... 250/252.1 A X |
| 5,118,943 | 6/1992 | LeBars et al. ............... 358/213.16 X |
| 5,405,276 | 4/1992 | Schrock ..................... 358/213.15 X |

*Primary Examiner*—Victor R. Kostak
*Attorney, Agent, or Firm*—L. A. Alkov; W. K. Denson-Low

[57] ABSTRACT

A combined scene-based and DC-restored image restoration system enhances the utility of video images generated from the input of a forward-looking infrared system. This system and related methods remove a desired portion of the DC content from each of a plurality of input signals that are generated from a plurality of adjacent portions of a source image to obtain a plurality of resultant signals from which a plurality of video images is produced.

8 Claims, 2 Drawing Sheets

IMAGE RESTORATION SYSTEMS AND METHODS UTILIZING INPUT SIGNALS WITH MODIFIED DC SIGNAL CONTENT

BACKGROUND OF THE INVENTION

1. Field of the Invention

This invention relates to systems and methods for improving the quality of video images generated by a forward-looking infrared (FLIR) sensor array. These systems and methods combine the means and method steps of scene-restored and DC-restored systems and methods, and include an adaptive clamp level which can vary over a single image, rather than a clamp level which is constant for a single image.

2. Description of Related Art

Until now, image restoration systems used DC restoration alone or scene restoration alone to generate video images based upon information received from sensors. In the case of images obtained from FLIR sensors, a DC restoration system provides good ground/sky distinction, but lacks local area contrast. DC-restored video images from FLIR sensors, though suitable for a pilot following "Nap of the Earth" flying techniques, lack the definition necessary to detect targets against a uniform background such as the sky or the sea.

By contrast, a scene-restored system provides images that are highly uniform and have high local contrast, but can include horizontal artifacts, and have poor ground/sky distinction. Such a system is suitable for target detection, but not for "Nap of the Earth" flying techniques.

A common FLIR sensor system includes a vertical array of detectors, which is scanned horizontally across a scene to form a complete FLIR image. The detectors in the array are AC-coupled, meaning that any DC component of the FLIR image is lost. To restore the DC component, the detector array scans a uniform temperature source, which permits subsequent image processing to restore the lost DC component.

As an example, FIGS. 1, 2 and 3 show plots of an average scene output and an average source output for each detector in a vertical array of detectors in a FLIR system. The image used for these graphs is a typical, airborne FLIR image, which includes sky, ground and horizon.

FIG. 1 shows a DC-restored image, meaning an image that is the same as the original scene. The left-hand side of FIG. 1 shows the sky, which is cold, and the right-hand side of the graph, the ground, which is warm. The dip at the center of the graph occurs at the horizon. In FIG. 1, the average source output is constant for each detector because the source is at a uniform temperature. The image seen by the FLIR system is restored by adding an offset value to the output of each detector to force the source output to be equal to a constant, called the Clamp Level. The overall dynamic range for such an image is large, and thus difficult to map to the limited number of gray shades available with a display device such as the heads-up display devices.

FIG. 2 is a graph made from the same scene as FIG. 1, but with the image scene-restored instead of DC-restored. The average scene output is constant for each detector, and shows no distinction between ground and sky, and no definition at the horizon. The average temperature source is not constant, though all detectors scan the same uniform temperature source. The overall dynamic range is smaller in FIG. 2 than in FIG. 1, and is easier to map to a limited number of gray shades.

Until now, no system has provided the advantages of both a scene-restored and a DC-restored system, though such a system is highly desirable.

SUMMARY OF THE INVENTION

This invention relates to image restoration methods and systems called pseudo-DC restored methods and systems that include means for DC restoring the images and means for scene-based restoring the images. These systems include means for removing a portion of the DC component of a scene in an amount sufficient to increase the contrast of the image in areas of the scene with a low dynamic range, and, preferably, with minimal image distortion and minimal horizontal artifacts. These systems, in preferred embodiments, also include means for evaluating data derived from signals produced by a plurality of sensors, means for determining the appropriate output of each sensor, and means for generating the desired output signals from each sensor.

The methods include the following steps: evaluating data derived from signals produced by a plurality of sensors; determining the appropriate output of each sensor; and generating a desired output signal from each sensor. The generating step, in preferred embodiments, includes the steps of: calculating a plurality of restoration signals to be combined with a plurality of input signals that include desired image data for video display; combining the restoration signals with the input signals to obtain a plurality of desired resultant signals; and directing the resultant signals to produce a plurality of video images. The calculating step includes removing a portion of the DC content of the restoration signal, preferably in an amount sufficient to increase the contrast of the imaging areas of the scene with a low dynamic range. In preferred embodiments, the removing step includes removing a portion of the DC component with minimal image distortion and minimal introduction of horizontal artifacts.

In preferred embodiments, the input signals are received from an array of forward-looking infrared (FLIR) sensors. The array includes 160 vertically-aligned sensors. Each generates signals used to produce horizontal lines of a video display as the sensor array scans the desired scene. In preferred embodiments, one complete scan by the array includes the scan of a constant temperature source, contained within the FLIR assembly, in addition to the scan of a desired scene. The scan of a constant temperature source provides a uniform stimulus to enable the system to identify variations in the outputs of different sensors within the array.

The amplitudes of the analog input signals resulting from the scan of the scene and of the constant temperature source for each sensor channel are converted to digital representations and stored in memory devices. An average amplitude is calculated from a desired sampling of the stored data for each sensor channel. In preferred embodiments, separate averages are determined for the desired samplings of data from the scene scan and the constant temperature source scan. The averages calculated for each sensor channel are then used to determine the desired output signals for that particular sensor channel. The computed average of the scene scan sampling is designated $E_0ARE_n$ for each channel n, and the computed average of the source scan sampling is designated $E_0DCR_n$ for each channel n.

Once determined, the desired output signal is stored until needed. In preferred embodiments, the signals are stored in memory devices. At desired times, the output signals from each channel are retrieved from memory.

To DC-restore an image, a desired DC offset signal is calculated for each sensor channel. The DC offset signal is calculated to ensure that the outputs of all the sensors as they scan the uniform temperature source are the same. The digital values of these offset signals are represented by the following:

$$DCR_n(\text{new}) \text{ equals } DCR_n(\text{old}) \text{ plus } k_n(\text{Clamp Level minus } E_0DCR_n) \quad \text{(EQUATION 1)}$$

where $k_n$ is a constant defined by the system, and is chosen to optimize the gain for each channel. Clamp Level is the same for all channels, and is adjusted to optimize system dynamic range. $E_0DCR_n$ is an average of a desired number of samples of the source video for each channel, preferably 32 samples.

To scene-restore an image, the digital values of the DC offset signals are represented by the following:

$$DCR_n(\text{new}) \text{ equals } DCR_n(\text{old}) \text{ plus } k_n(\text{Clamp Level minus } E_0ARE_n) \quad \text{(EQUATION 2)}$$

where $k_n$ is a constant defined by the system, and is chosen to optimize the closed loop response for each input channel. Clamp Level is a constant. $E_0ARE_n$ is an average of a number of samples of the scene video for each channel n, preferably 128 samples for each channel every sixth pixel.

In the pseudo DC-restored system, the digital values of the DC offset signal are represented by equation (1) above, except that Clamp Level is not the same for every channel. Instead, the Clamp Level is calculated in accordance with the following equations:

$$\text{Avg Video}_0 \text{ equals } E_0ARE_0 \text{ minus } E_0DCR_0 \quad \text{(EQUATION 3)}$$

$$\text{Avg Video}_n \text{ equals Avg Video}_{n-1} \text{ plus } f \text{ times } (E_0ARE_n \text{ minus } E_0DCR_n \text{ minus Avg Video}_{n-1}) \quad \text{(EQUATION 4)}$$

$$\text{Clamp Level}_n \text{ equals Initial Clamp Level minus Avg Video}_n \quad \text{(EQUATION 5)}$$

Here, f is in the range $0 < f < 1$, and is a filter time constant. Initial Clamp Level is set to optimize the system dynamic range. The Initial Clamp Level is set to adjust the absolute dynamic range of the system, i.e. the minimum and maximum temperatures the system can sense and display without saturation. The Initial Clamp Level is calculated from the required maximum displayed temperature, the actual, measured temperature of the source, a system constant (k), and the average video for the first detector, in accordance with the following Equation 6:

$$\text{Initial Clamp Level equals (Dynamic Range Maximum Temperature minus Source Temperature) times } k \text{ plus Average Video}$$

As a result, the Clamp Level is a filtered version of the actual scene video, and is used to selectively compress the video by removing part of its DC offset. The amount of compression is adjusted by altering the value for f. If f is 0, no compression takes place, and the system becomes a pure DC-restored system. If f is 1, the dynamic range is completely compressed and the system becomes a pure scene-restored system.

In actual tests, an optimum value for f has been found to be 0.06 for systems that are ground based, and view high dynamic range scenes. The tests were based on subjective image quality, using the pseudo DC restored system looking out of a window at scenes including buildings, cars, people and the horizon. A different optimum value of f would apply to an airborne FLIR operating at night.

Generally speaking, the methods and systems of this invention remove a portion of the DC component of a scene sufficient to increase the contrast of the image in areas of the scene with a low dynamic range, without perceptibly distorting the image, and without introducing horizontal artifacts.

BRIEF DESCRIPTION OF THE DRAWINGS

This invention can better be understood by reference to the drawings, in which.

DESCRIPTION OF THE PREFERRED EMBODIMENT

Figure 1:
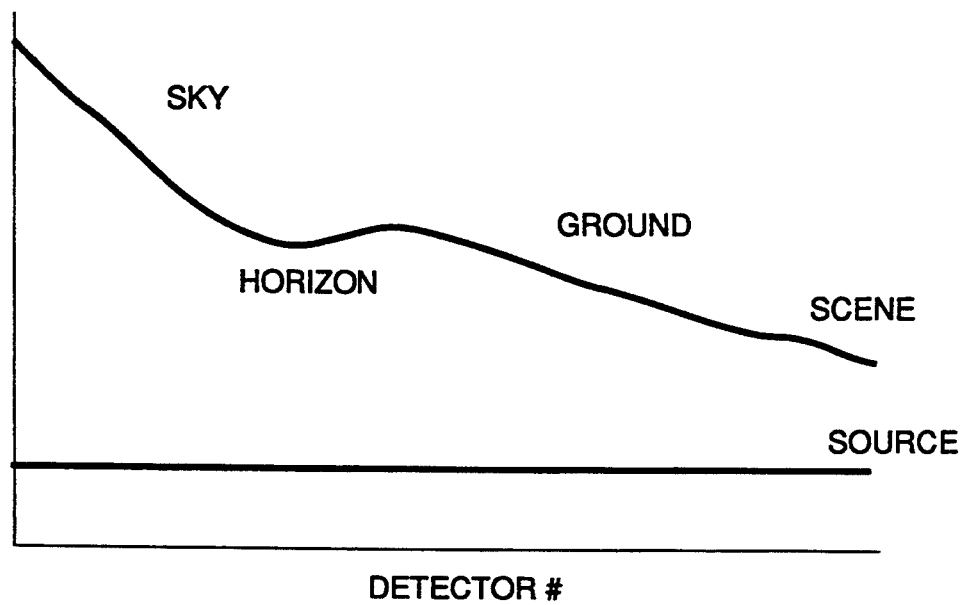
FIG. 1 is a graph of DC-restored signals obtained from a FLIR imaging system scanning a scene.
Figure 2:
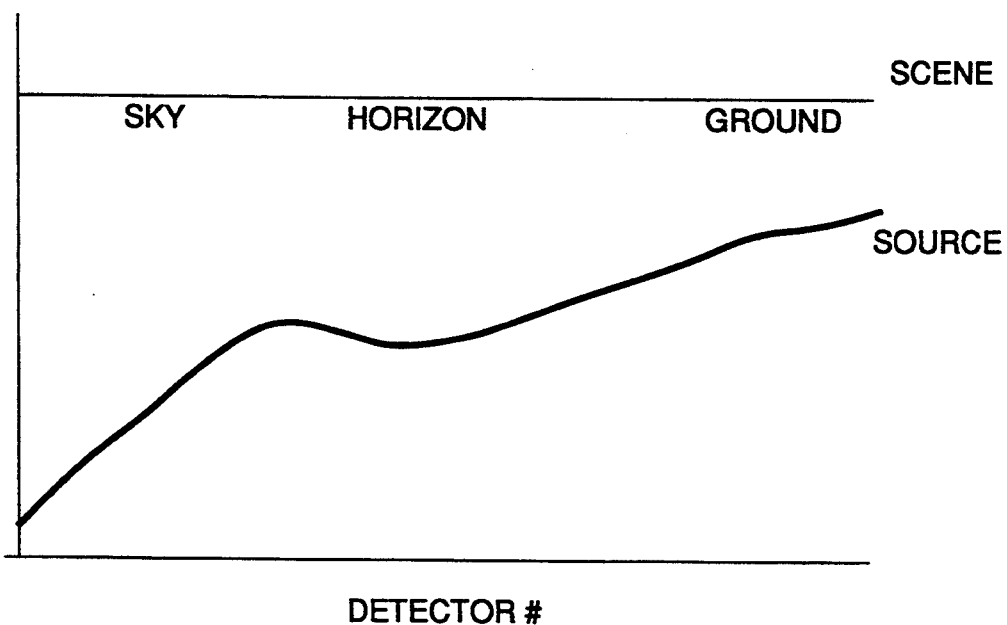
FIG. 2 is a graph showing scene-restored signals obtained from the same system scanning the same scene as in FIG. 1.
Figure 3:
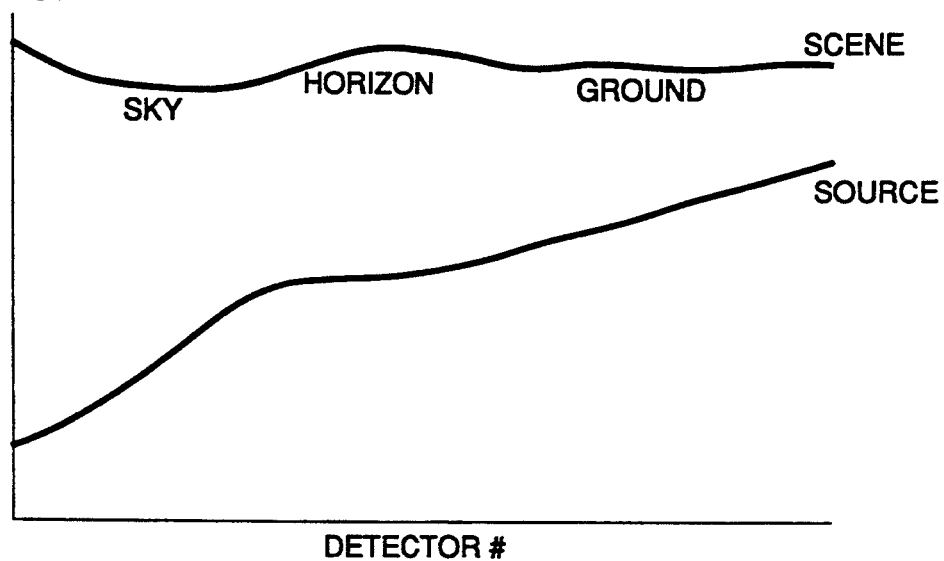
FIG. 3 is a graph showing pseudo DC-restored signals from the same system scanning the same scene as FIGS. 1 and 2.

FIG. 3 is a graph of pseudo DC-restored signals obtained by scanning the same scene with the same FLIR array as the signals depicted in FIGS. 1 and 2. An offset was added to each detector to force the average source video to equal the Clamp Level. However, instead of using a constant value for the Clamp Level, different values were used for each detector. The Clamp Level was relatively constant between adjacent detectors, but varied more widely over the entire image. The Clamp Level was calculated to reduce the overall scene dynamic range, but was almost constant over small areas of the scene. Thus, the image still has good horizon definition, and good ground/sky distinction.

Figure 4:
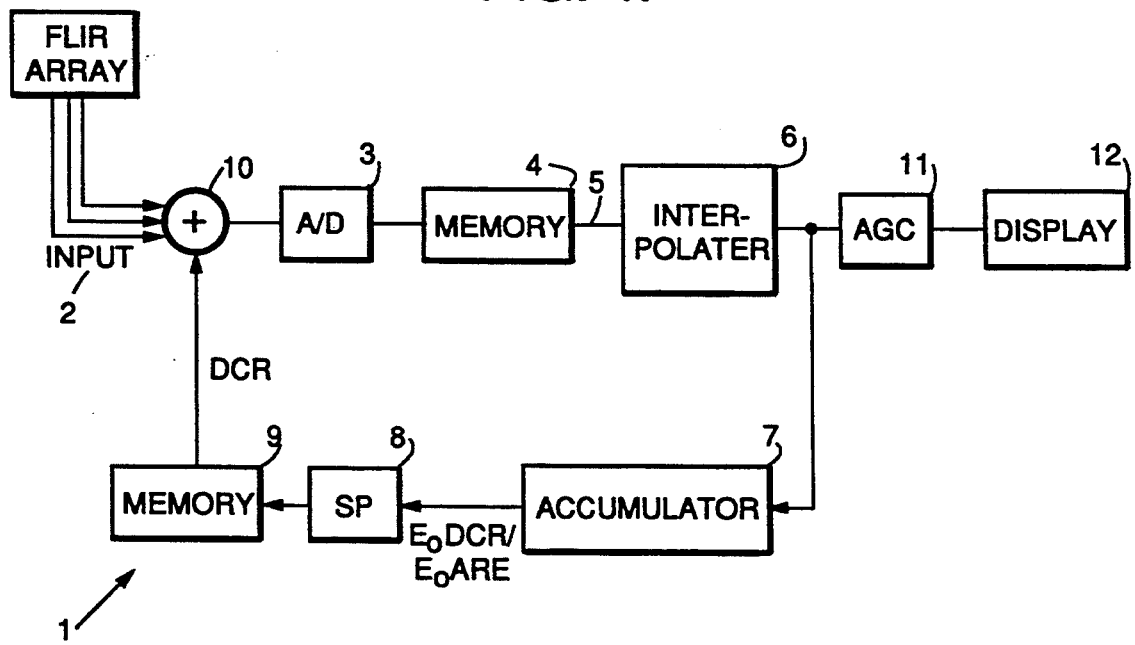
FIG. 4 shows a schematic block diagram illustrating a preferred embodiment of the pseudo DC-restored image restoration system of this invention.

FIG. 4 shows, in block diagram form, image restoration system 1. The signals received from a forward-looking infrared (FLIR) sensor array appear at input 2 of system 1. The amplitudes of these signals are converted from analog to digital form in the A/D converter 3. These digital data are then stored in memory 4, and delivered to interpolator 6 on path 5 as required. System 1 includes interpolator 6 to produce the desired mapping on sensor channels to output lines. AGC 11 receives the temperature outputs for the various output lines, and maps them into output gray shades. AGC 11 also adjusts the output gain such that the full range of sensed temperatures is displayed without saturating the display 12. Accumulator 7 receives the outputs of the various sensor channels, and calculates the average for each sensor channel. These averages are designated $E_0ARE$ and $E_0DCR_n$ for each channel n. Microprocessor 8 calculates the outputs for each sensor channel, and stores the values in memory 9. At a desired time, the output signals are introduced into the system via adder 10.

The system shown in FIG. 4 includes, in preferred embodiments, 160 parallel channels, each with its own programmable offset. The FLIR image is scanned at 60 Hz for one field, with each channel scanning one horizontal line of the image. To DC restore the image, all 160 channels scan a constant temperature object during part of each field. This constant temperature object is called the source. The image is digitized, scan converted, frame stored, interpolated to 240 lines, converted to analog form, and output to a standard interlaced TV screen. The microprocessor in the system, denoted SP for signal processor, calculates the offset values to be added to each channel. These offset values are denoted DCR's. An accumulator averages 32 samples of a source video for each channel; these values are called $E_0DCR$'s. The accumulator also averages 128 samples of the scene video for each channel, i.e. every sixth pixel, and these values are called $E_0ARE$'s.

While preferred embodiments of the present invention have been described and illustrated, other modifications will be apparent to those skilled in the art and it is intended to include all such modifications and variations within the scope of the appended claims.

What is claimed is:

1. An image restoration method comprising the steps of:
   calculating a plurality of restoration signals to be combined with a plurality of input signals, said input signals including the desired image data for video display in which calculating said restoration of signals comprises the steps of;
   (i) extracting data from said input signals,
   (ii) calculating a plurality of average values for a plurality of desired samplings of the data extracted from said input signals, and
   (iii) relating said average values for each desired sampling for a desired time interval to determine a plurality of restoration signals such that the averages of each resultant signal are substantially equal during a desired time interval;
   combining said restoration signals with said input signals to obtain a plurality of desired resultant signals;
   directing said resultant signals to produce a plurality of video images, said calculating step including the step of removing a portion of the DC content of each of said restoration signals; and
   a forward-looking infrared sensor array provides said input signals, wherein said extracting of data includes measuring a plurality of amplitudes of said input signals from said sensor array during a scene scan and during a source scan, said scene scan comprising a time period in which said sensor array provides input signals of a scan of a scene and said source scan comprising a time period in which said sensor array provides input signals of a scan of a uniform temperature source, and wherein a sampling of said amplitudes are used to calculate said plurality of average values.

2. The method of claim 1 wherein said calculating step includes generating the restoration signal for the nth input signal in a closed loop manner by calculating the restoration signal for the next scene scan from the restoration signal used in the current scene scan in accordance with the following equation:

$$DCR_n(new) = DCR_n(old) + k_n \text{ times } (\text{Clamp Level}_n - E_0DCR_n)$$

where $k_n$ is a constant defined by the system, and chosen to optimize the closed loop response for each input signal; $DCR_n(new)$ is the restoration signal for the nth input signal for the next scene scan; $DCR_n(old)$ is the restoration signal for the nth input signal for the current scene scan; $E_0DCR_n$ is the average of a desired number of samples of the nth input signal for the current source scan; Clamp Level$_n$ = Initial Clamp Level − Average Video$_n$; Initial Clamp Level = the maximum temperature to be displayed minus the actual temperature of the source, each multiplied by system constant k, plus Average Video$_n$; where Average Video$_n$ is calculated using the following equations, the first equation for the 0th input signal, and the second equation for calculating the value of Average Video$_D$ for the nth input signal from the value of Average Video for the n-1th input signal;

$$\text{Average Video}_0 = E_0ARE_0 - E_0DCR_0$$

$$\text{Average Video}_n = \text{Average Video}_{n-1} + f \text{ times } (E_0ARE_n - E_0DCR_n - \text{Average Video}_{n-1})$$

where $E_0ARE_n$ is the average of a desired number of samplings of the nth input signal for the current scene scan; and f is a number greater than zero and less than 1, and is equal to the amount of desired compression of said input signals.

3. An image restoration system comprising a source having plurality of signal sensors for performing a scene scan;
   means for determining the appropriate signal output from each of said sensors;
   means for generating the desired output signals from each of said sensors;
   said generating means including means for calculating a plurality of restoration signals to be combined with a plurality of input signals, said input signals including the desired image data for a video display;
   means for combining the restoration signals with said input signals to obtain a plurality of desired resultant signals;
   means for directing the resultant signals to produce a plurality of video images, said calculating means including means for removing a portion of the DC content of the restoration signal;
   means for extracting data from said input signals;
   means for calculating a plurality of average values for a plurality of desired samplings of the data extracted from said input signals; and
   means for relating the average values for each desired sampling for a desired time interval to determine a plurality of restoration signals such that the averages of each resultant signal are substantially equal during a desired time interval.

4. The system of claim 3 further comprising:
   a forward-looking infrared sensor array that includes said detectors.

5. The system of claim 3 wherein said means for calculating a plurality of restoration signals includes means for generating a restoration signal for the nth input signal in a closed loop manner by calculating the restoration signal for the next scene scan from the restoration signal used in the current scene scan in accordance with the following equation:

$$DCR_n(new) = DCR_n(old) + \text{times (Clamp Level}_n - E_0DCR_n)$$

where $k_n$ is a constant defined by the system, and chosen to optimize the closed loop response for each input signal; $DCR_n(new)$ is the restoration signal for the nth input signal for the next scene scan; $DCR_n(old)$ is the restoration signal for the nth input signal for the current scene scan; $E_0DCR_n$ is the average of a desired number of samples of the nth input signal for the current source scan; Clamp Level$_n$ = Initial Clamp Level − Average Video$_n$; Initial Clamp Level = the maximum temperature to be displayed minus the actual temperature of the source, each multiplied by system constant k, plus Average Video$_n$; where Average Video$_n$ is calculated using the following equations, the first equation for the 0th input signal, and the second equation for calculating the value of Average Video$_n$ for the nth input signal from the value of Average Video for the n-1th input signal;

$$\text{Average Video}_0 = E_0ARE_n - E_0DCR_0$$

$$\text{Average Video}_n = \text{Average Video}_{n-1} + f \text{ times} (E_0ARE_n - E_0DCR_n - \text{Average Video}_{n-1})$$

where $E_0ARE_n$ is the average of a desired number of samplings of the nth input signal for the current scene scan; and f is a number greater than zero and less than 1, and is equal to the amount of desired compression of said input signals.

6. The system of claim 4 wherein said means for calculating a plurality of restoration signals includes means for generating a restoration signal for the nth input signal in a closed loop manner by calculating the restoration signal for the next scene scan from the restoration signal used in the current scene scan in accordance with the following equation:

$$DCR_n(new) = DCR_n(old) + k_n \text{ times (Clamp Level}_n - E_0DCR_n)$$

where $k_n$ is a constant defined by the system, and chosen to optimize the closed loop response for each input signal; $DCR_n(new)$ is the restoration signal for the nth input signal for the next scene scan; $DCR_n(old)$ is the restoration signal for the nth input signal for the current scene scan; $E_0DCR_n$ is the average of a desired number of samples of the nth input signal for the current source scan; Clamp Level$_n$ = Initial Clamp Level − Average Video$_n$; Initial Clamp Level = the maximum temperature to be displayed − the actual temperature of the source, each multiplied by system constant k, +Average Video.; where Average Video$_n$ is calculated using the following equations, the first equation for the 0th input signal, and the second equation for calculating the value of Average Video$_n$ for the nth input signal from the value of Average Video for the n-1th input signal;

$$\text{Average Video}_0 = E_0ARE_0 - E_0DCR_0$$

$$\text{Average Video}_n = \text{Average Video}_{n-1} + f \text{ times} (E_0ARE_n - E_0DCR_n - \text{Average Video}_{n-1})$$

where $E_0ARE_n$ is the average of a desired number of samplings of the nth input signal for the current scene scan; and f is a number greater than zero and less than 1, and is equal to the amount of desired compression of said input signals.

7. An image enhancement method comprising the steps of removing a desired portion of the DC content from each of a plurality of input signals to obtain a plurality of resultant signals, said input signals being generated from a corresponding plurality of adjacent portions of a source image, said input signals including the desired image data for video display; and
   directing said resulting signals to produce a plurality of video images;
wherein said removing step comprises:
   extracting date from said input signals,
   calculating a plurality of average values for a plurality of desired samplings of the data extracted from said input signals, and
   determining said desired portion of the DC content to be removed from each of said plurality of input signals from said average values for a desired time interval such that the range of average values over all of said resultant signals is reduced, and such that the difference between the average values of the resultant signals derived from the input signals for any two most closely spaced portions of said source image is substantially the same as the difference between the average values of the corresponding two input signals.

8. The method of claim 5 in which a forward-looking infrared sensor array provides said input signals, wherein said extracting of data includes measuring a plurality of amplitudes of said input signals from said sensor array during a scene scan, said scene scan comprising a time period in which said sensor array provides input signals of a scan of a scene, and wherein a sampling of said amplitudes is used to calculate said plurality of average values.

* * * * *